United States Patent
Croxford et al.

(10) Patent No.: US 10,878,592 B2
(45) Date of Patent: Dec. 29, 2020

(54) VIDEO DATA PROCESSING

(71) Applicants: Apical Ltd, Cambridge (GB); Arm Limited, Cambridge (GB)

(72) Inventors: Daren Croxford, Swaffham Prior (GB); Sharjeel Saeed, Cambridge (GB); Alexey Lopich, Loughborough (GB)

(73) Assignees: Apical Limited, Cambridge (GB); Arm Limited, Cambridge (GB)

(*) Notice: Subject to any disclaimer, the term of this patent is extended or adjusted under 35 U.S.C. 154(b) by 115 days.

(21) Appl. No.: 15/987,661

(22) Filed: May 23, 2018

(65) Prior Publication Data

US 2019/0362518 A1 Nov. 28, 2019

(51) Int. Cl.
*G06T 7/73* (2017.01)
*G06N 3/04* (2006.01)
*G06N 3/08* (2006.01)

(52) U.S. Cl.
CPC ............. *G06T 7/73* (2017.01); *G06N 3/04* (2013.01); *G06N 3/08* (2013.01); *G06T 2207/10016* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 6,335,985 B1* | 1/2002 | Sambonsugi | G06K 9/3241 382/190 |
| 10,223,611 B1* | 3/2019 | Price | G06K 9/6232 |
| 2005/0105765 A1* | 5/2005 | Han | G06K 9/00295 382/100 |
| 2015/0161823 A1* | 6/2015 | Anderson-Sprecher | G06T 15/005 345/419 |
| 2017/0200050 A1* | 7/2017 | Zhang | G06K 9/00751 |
| 2018/0164984 A1* | 6/2018 | Kunieda | G06K 9/00677 |
| 2018/0173992 A1* | 6/2018 | Zink | G06T 1/20 |
| 2019/0065910 A1* | 2/2019 | Wang | G06K 9/6277 |
| 2019/0188866 A1* | 6/2019 | Mehrseresht | G06N 3/08 |
| 2019/0266387 A1* | 8/2019 | Sun | G06K 9/6256 |
| 2019/0304102 A1* | 10/2019 | Chen | G06K 9/6272 |

* cited by examiner

*Primary Examiner* — Zhitong Chen
(74) *Attorney, Agent, or Firm* — EIP US LLP

(57) ABSTRACT

A method of processing video data representative of a video comprising a first and second frame to generate output data representative of at least one feature of the second frame. The method includes identifying a first and second portion of the second frame, which correspond to a first and second portion of the first frame, respectively. First feature data obtained by processing first frame data associated with the first portion of the first frame using a first feature detection operation is retrieved from storage. Second feature data representative of a second feature map is generated by processing second frame data associated with the second portion of the second frame using the first feature detection operation. The first feature data and the second feature data are processed using a second feature detection operation to generate the output data.

20 Claims, 7 Drawing Sheets

VIDEO DATA PROCESSING

BACKGROUND OF THE INVENTION

Technical Field

The present invention relates to methods and apparatus for processing video data representative of a video.

Background

Methods to process video data, for example to perform feature detection operations such as object detection or object recognition, may be computationally intensive. It is desirable to reduce the processing demands of such methods.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Portions of a video may remain relatively unchanged from frame to frame. As an illustrative example, if the video has been obtained from a security camera at a fixed position, the portion of the video corresponding to a background of a scene, which may stay the same over time, may also remain the same over a series of frames.

Processing a video, for example to perform a feature detection operation such as object detection or object recognition, typically requires a significant amount of computation. However, some of this processing may be redundant if portions of the video have not changed or have changed a relatively small amount over time.

Figure 1:
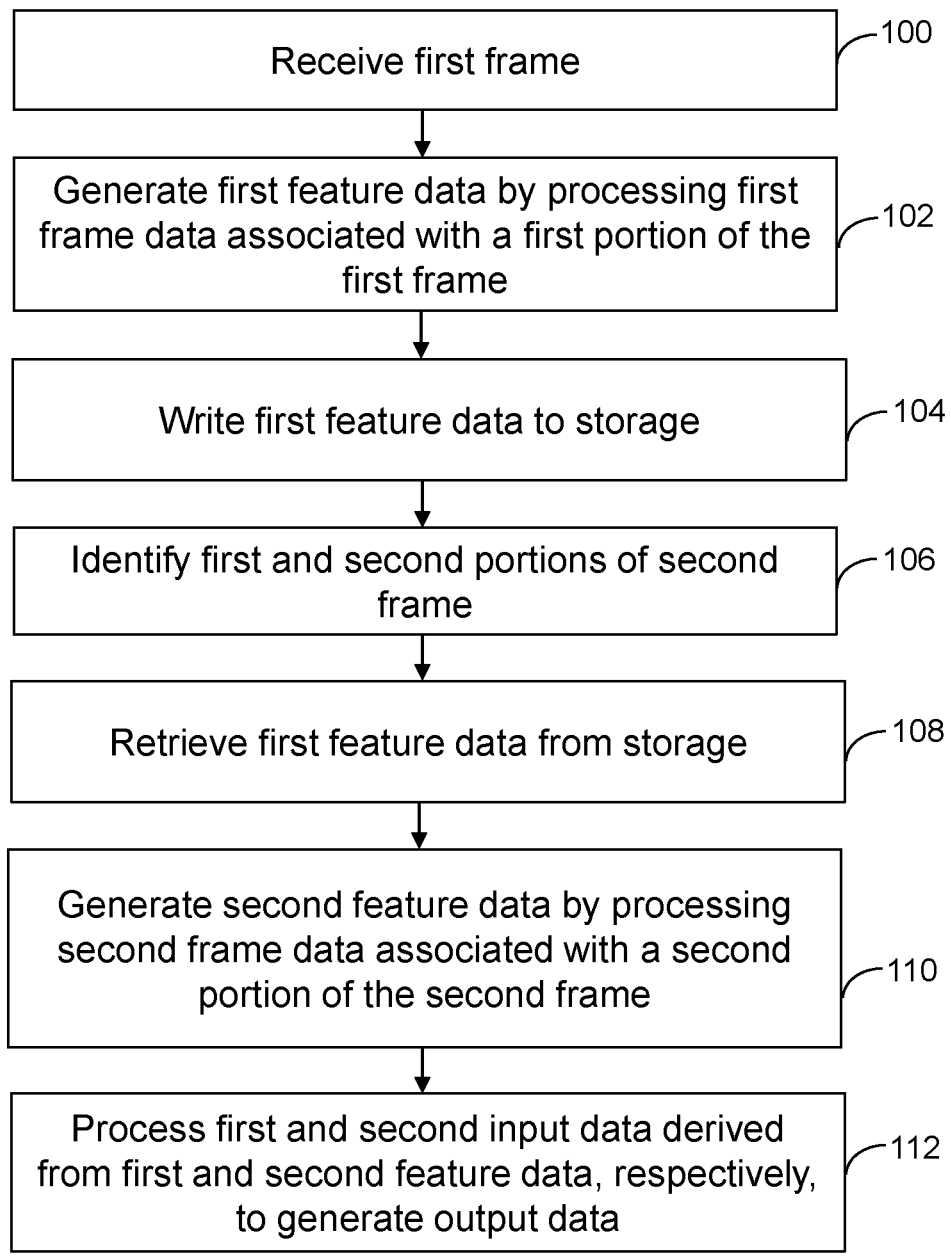
FIG. 1 is a flow diagram showing a method of processing video data according to examples.

FIG. 1 shows an example of a method of processing video data including a first frame and a second frame to generate output data representative of at least one feature of the second frame. Methods in accordance with FIG. 1 may be used to reduce the computation for determining the at least one feature of the second frame. The method of FIG. 1 may be implemented by a video processing system, such as the system illustrated schematically in FIG. 8 (described below).

In the example of FIG. 1, the second frame is subsequent to the first frame. The second frame may be immediately consecutive to the first frame (with no intervening frames therebetween) or there may be one or more frames between the first frame and the second frame. A frame for example corresponds to a still image. A series or sequence of frames, which typically represent a series of sequential images, can be considered to correspond to a video or a moving picture. A frame generally includes a plurality of pixels.

The at least one feature the method of FIG. 1 may be used to identify may be a structure-based feature indicative of the presence of certain types of structure in the image, such as edges or lines in the image. Alternatively, the at least one feature may be an object-based feature indicative of the presence of a particular class of object in the image (such as a person, a vehicle or an animal), or an image-based feature indicative that the image may be categorized or classified into a particular category based on the content of the image.

At item 100 of FIG. 1, the first frame of the video is received. At item 102 of FIG. 1, first feature data is obtained by processing first frame data associated with a first portion of the first frame is obtained. The first feature data may be obtained using a first feature detection operation, for example. A feature detection operation is for example an image processing operation which may be used to identify features or characteristics of an image or a portion of an image, such as structure-based, object-based or image-based features, as described above. A feature detection operation may for example involve processing the first frame data using a convolutional layer of a convolutional neural network (CNN). In such cases, the first feature data may be representative of a first feature map. An example of using a CNN to perform the feature detection operation is discussed further below with reference to FIG. 3. However, in other examples, the feature detection operation may involve the use of another computer vision or image processing algorithm. For example, the feature detection operation may include the generation of feature descriptors such as a histogram of oriented gradients (HOG), which may for example be used for object detection. The feature detection operation may additionally or alternatively involve the use of a different machine learning model or algorithm than a CNN. For example, a support vector machine (SVM) may be used. The exact nature of the feature detection operation is not limited to these examples though, and other feature detection operations may be used in examples similar to those described herein.

Although not shown in FIG. 1, it is to be appreciated that further processing may be applied to the first feature data, for example to identify at least feature of the first frame. This is discussed further below with reference to FIG. 6.

At item 104 of FIG. 1, the first feature data is written to storage. This allows the first feature data to be retrieved for subsequent processing operations. However, in some cases, the first feature data may not be written to storage and may instead be retained locally for subsequent re-use.

At item 106 of FIG. 1, a first portion of the second frame and a second portion of the second frame are identified. The first portion of the second frame for example corresponds to the first portion of the first frame for which the first feature data is generated at item 102. The second portion of the second frame for example corresponds to a second portion of the first frame, which is different from the first portion of the first frame. Hence, the second portion of the second frame may also be different from the first portion of the second frame, and may be non-overlapping or separate from the first portion of the second frame.

Example methods of identifying the first and second portions of the second frame are described further below with reference to FIGS. 4 to 6.

At item 110 of FIG. 1, second feature data is generated. In examples in accordance with FIG. 1, generating the second feature data includes processing second frame data associated with the second portion of the second frame using a feature detection operation such as that applied to the first portion of the first frame to generate the first feature data (which is for example referred to herein as the first feature detection operation). For example, the second frame data may be processed using the convolutional layer of the CNN to generate the second feature data. As for the first feature data, the second feature data may represent a second feature map. In examples, the first feature detection operation may be considered to correspond to a local feature detection operation, which allows local features of a frame to be identified. For example, the first feature detection operation may be used to identify the features of the first portion of the first frame (to generate the first feature data) and the features of the second portion of the second frame (to generate the second feature data). However, this is not intended to be limiting.

At item 108 of FIG. 1, the first feature data is retrieved from storage. It is to be appreciated that this item may, however, be omitted in cases in which the first feature data is not written to storage.

At item 112 of FIG. 1, first input data derived from the first feature data and second input data derived from the second feature data are processed to generate the output data representative of at least one feature of the second frame. The first input data and the second input data are processed using a second feature detection operation to generate the output data in examples. The first and second feature detection operation may each correspond to a sub-part of a feature detection operation, such as different steps or sets of steps of a multi-step algorithm. For example, where the first and second feature data is obtained by processing the first and second frame data using a convolutional layer of a CNN, the first and second input data may be processed using a fully connected layer of this CNN to generate the output data, as described further below and shown in FIG. 8. It is to be appreciated that the output data may be second output data, and that first output data (representative of the at least one feature of the first frame) may have been generated previously (although this is not shown in FIG. 1). In other examples, though, the first and second feature detection operations may not form part of a common feature detection algorithm. For example, the second feature detection operation may be similar to or the same as the first feature detection operation, but based on different input data. However, the second feature detection operation may be considered to correspond to a global feature detection operation, which allows global features of a frame (such as the second frame) to be identified. For example, these global features may include features derived from multiple portions or regions of the second frame to represent a content of the second frame as a whole, or to represent a content of the second frame across a larger area than that processed using one application of the first feature detection operation (such as a larger area than solely the second portion of the second frame).

In this example, the first portion of the first frame corresponds to the first portion of the second frame. The first portions of the first and second frame may each contain the same content, such as the same patch of sky. For example, these portions may remain constant or the same across the plurality of frames. For example, the first portion may have the same location, and may correspond to the same pixel coordinates, in each of the first and second frames.

In other examples, a location of the first portion may change between the first and second frames. In such cases, though, the first portion may each correspond to the same portion of a scene captured in the plurality of frames. For example, where a video camera used to capture the video is moved from frame to frame, the first portion may for example correspond to the same patch of sky in each of the frames, although the position of that patch of sky (expressed in terms of pixel coordinates) may differ between frames. Detection of movement from frame to frame may be performed using various different motion detection approaches, such as motion estimation techniques or the use of an accelerometer or motor driver coupled to a video recording device used to capture the video. The detected movement may be used to aid in the identification of a first portion of the second frame which corresponds to the first portion of the first frame.

In view of this, the first portion of the second frame may be substantially the same as the first portion of the first frame. Portions of two different frames may be considered to be substantially the same where they are identical, and for example include pixels with identical pixel values (such as identical pixel intensity values). In other cases, portions of two different frames may be considered to be substantially the same where they are similar or the same within a certain tolerance. For example, where a difference between portions of two difference frames is less than 20%, 15%, 10%, 5% or 1%, these portions may be considered to be substantially the same.

Hence, in examples such as FIG. 1, the first input data (which is obtained from processing of the first frame) may be used to represent the first portion of the second frame, rather than applying the feature detection operation to the first portion of the second frame. This may therefore reduce the amount of processing compared with processing each frame in its entirety, regardless of its similarity to a previous frame. Consequently, this may improve the efficiency and reduce the power consumption of methods such as that of FIG. 1. Furthermore, the latency (or the time taken) in processing a frame to detect features of the frame may be reduced. Alternatively, by allowing feature detection to be performed more efficiently, methods described herein may allow more complex analyses to be performed.

By processing the first and second input data to generate the output data, methods in accordance with FIG. 1 may therefore combine data obtained from the first frame (the first input data) with that obtained from the second frame (the second input data). Such methods may nevertheless allow feature(s) of the second frame to be accurately identified, with improved efficiency. As will be appreciated, the method of FIG. 1 may be applied repeatedly as further frames of the video are received, to further reduce the amount of processing performed.

As explained above, in examples in accordance with FIG. 1, the first feature data and the second feature data may be obtained by processing first and second frame data (respectively) using a convolutional layer of a CNN. An example of a CNN 114 is shown schematically in FIG. 2.

Figure 2:
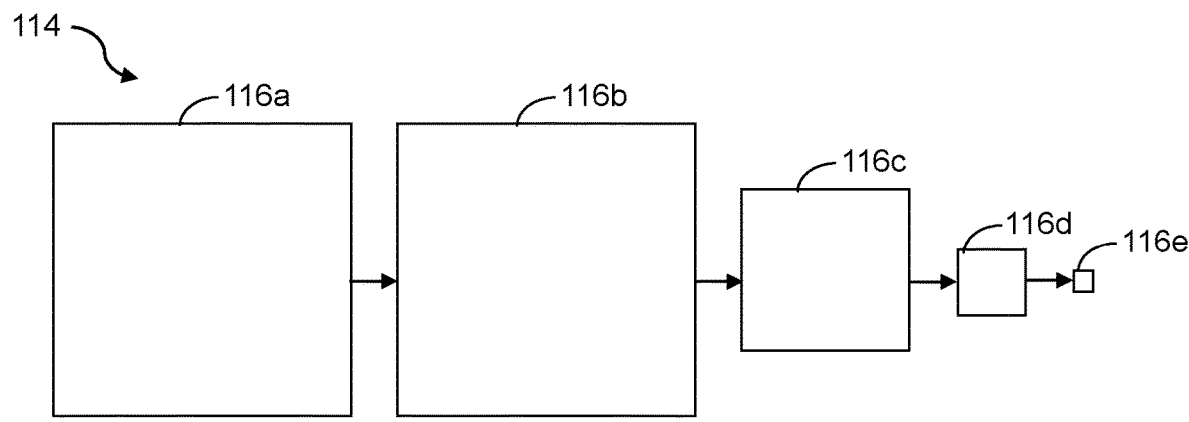
FIG. 2 shows schematically a neural network according to examples.

The CNN 114 includes a number of different layers 116a, 116b, 116c, 116d, 116e. In FIG. 2, the CNN 114 includes an input layer (116a), a plurality of convolutional layers (two of which, 116b, 116c, are shown in FIG. 2), a number of fully connected layers (one of which, 116d, is shown in FIG. 2) and an output layer 116e. The input layer for example corresponds with an input to the CNN 114, which in this example is image data. The image data is for example 224 pixels wide and 224 pixels high and includes 3 color channels (such as a red, green and blue color channel). The convolutional layers typically extract particular features from the input data, to create feature maps. The fully connected layers then use the feature maps for classification. In the example of FIG. 2, the output of the second layer 116b undergoes pooling before it is input to the third layer 116c. Pooling for example allows values for a region of an image or a feature map to be aggregated or combined, for example by taking the highest value within a region. For example, with 2×2 max pooling, the highest value of the output of the second layer 116b within a 2×2 patch of the feature map output from the second layer 116b is used as an input to the third layer 116c, rather than transferring the entire output of the second layer 116b to the third layer 116c. This reduces the amount of computation for subsequent layers of the CNN 114. This is shown schematically in FIG. 2 as a reduction in size of the third layer 116c compared to the second layer 116b. Further pooling is performed between the third and fourth layers 116c, 116d and between the fourth and fifth layers 116d, 116e. It is to be appreciated that the CNN 114 of FIG. 2 has been greatly simplified for ease of illustration and that typical CNNs may be significantly more complex.

In general, neural networks such as the CNN 114 of FIG. 2 may undergo what is referred to as a training phase, in which the neural network is trained for a particular purpose. A neural network typically includes a number of interconnected nodes, which may be referred to as artificial neurons, or neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole.

In the example of FIG. 2, the CNN 114 has been trained to classify image data, for example to determine whether a particular object is present in the image represented by the image data. Training the CNN 114 in this way for example generates one or more kernels associated with at least some of the layers (such as layers of the neural network 114 other than the input layer 116a and the output layer 116e). The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the object that the CNN 114 is trained to identify. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3 by 3 image patch) or each element of a feature map by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3 by 3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as an accumulation operation). Thus, a neural network accelerator, which may be dedicated to implementing a neural network, may include a multiplier-accumulator (MAC) unit configured to perform these operations.

After the training phase, the CNN 114 (which may be referred to as a trained CNN 114) may be used to classify input images. For example, the CNN 114 may be used to identify whether the object the CNN 114 has been trained to identify is present in a given input image. This process may be referred to as classification or inference. Classification typically involves convolution of the kernels obtained during the training phase with image patches of the input image to generate a feature map. The feature map may then be processed using at least one fully connected layer to classify the image.

In the example of FIG. 2, the second layer 116b involves the convolution of 64 different kernels with the image data of the first layer 116a. Each of the 64 kernels is for example arranged to identify a different respective feature of the image data. In the example of FIG. 2, in which the image data is 224 by 224 pixels, with 3 color channels, and is convolved with 64 kernels of a size of 3 by 3 pixels, the second layer 116b of the CNN 114 involves 224×224×3×(3×3)×64 multiply-accumulate operations, i.e. 86 million multiply-accumulate operations. There will also be a large number of further multiply-accumulate operations associated with each of the third and fourth layers 116c, 116d of the CNN 114, which involve convolving the output of the previous layer with 256 kernels and 512 kernels respectively in this example, in which the CNN 114 is the VGG-16 CNN. As will be appreciated, though, other neural networks may involve convolutions with a different number of kernels. Nevertheless, classification of an image using a neural network typically involves a large number of data processing operations, each of which consumes power.

Figure 3:
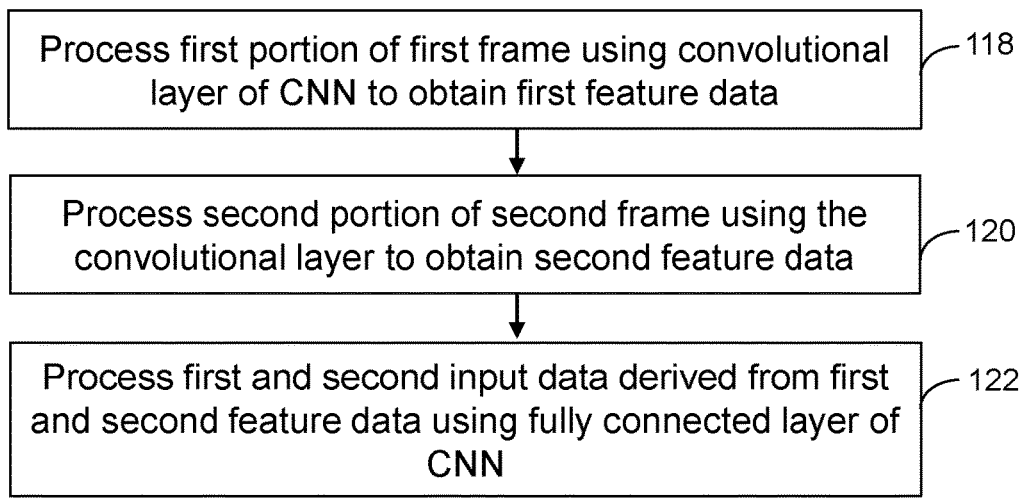
FIG. 3 is a flow diagram showing a method of generating output data according to examples.

Hence, the method in examples described herein, in which the first feature data is retrieved from storage rather than newly generated for the first portion of the second frame, may reduce the power consumption of a video processing system. FIG. 3 is a flow diagram showing an example of a method in which a CNN is used for a feature detection operation.

At item 118 of FIG. 3, the first frame data is processed using a convolutional layer of a CNN, such as one of the convolutional layers 116*b*, 116*c* of the CNN 114 of FIG. 2, to obtain the first feature data. The first frame data is associated with the first portion of the first frame and may represent pixel values of pixels of the first portion of the first frame. Alternatively, the first frame data may instead be otherwise derived from the first portion of the first frame. For example, the first frame data may represent a feature map obtained from processing the first portion of the first frame (or a previous feature map derived from the first portion of the first frame) using a convolutional layer of the CNN, such as a convolutional layer prior to the convolutional layer used to generate the first frame data at item 118.

At item 120 of FIG. 3, the second portion of the second frame is processed using the convolutional layer of the CNN to obtain second feature data. The second frame data is associated with the second portion of the second frame. Similarly to the first frame data, the second frame data may represent pixel values of pixels of the second portion of the second frame or other quantities derived from the second portion of the second frame such as a feature map derived from processing the second portion of the first frame or derived from processing a previous feature map obtained from the second portion of the second frame.

At item 122 of FIG. 3, first input data derived from the first feature data and second input data derived from the second feature data are processed using the fully connected layer of the CNN to generate the output data. The first and second input data may represent or be the same as the first and second feature data. Alternatively, one or both of the first and second input data may be obtained by processing the first and second feature data, respectively. For example, the first input data may be derived from the first feature data by processing the first feature data using at least one convolutional layer or by applying an activation function to the first feature map represented by the first feature data. An activation function (sometimes referred to as a rectifier) may be used to map an input to a predefined output, such as a value which is 0 or greater. A suitable activation function is the rectified linear unit (ReLU) function, although other activation functions are possible. By using an activation function, the amount of data to be processed may be reduced (as some inputs may be mapped to 0, and therefore may not require further processing). Furthermore, the data after application of an activation function may be smaller in size, and hence have lower storage requirements, and may be transferred with a reduced bandwidth.

In a CNN, a fully connected layer typically connects every neuron in one layer to every neuron in another layer, and may therefore be used to identify overall characteristics of an image, such as whether the second frame includes a particular object. Hence, the fully connected layer may be used to combine the first and second feature data to identify the at least one feature of the second frame.

From the description of FIG. 3, it is therefore to be appreciated that the processing of the first and second frame data using the convolutional layer of the CNN may be used to detect high-level image features, relating to structures of an image such as lines, edges, corners, ridges and so forth. Such features may be expressed in the form of a feature map, which may be output as an intermediate stage of a neural network such as a CNN. The output data may however represent lower-level image features representative of more complex characteristics of the second frame, such as the presence of a particular object in the second frame. As will be appreciated, in other examples, the first and second frame data may be processed using a different first feature detection operation to detect image features, such as high-level image features. Similarly, the first and second input data may also be processed using a different second feature detection operation to detect lower-level image features.

As noted above, examples described herein may involve the identification of first and second portions of the second frame, where the first portion of the second frame corresponds to the first portion of the first frame and the second portion of the second frame is for example different from the first portion of the first frame. FIG. 4 is a flow diagram illustrating an example method of identifying the first and second portions of the second frame. It is to be appreciated, though, that there are other ways in which the first and second portions of the second frame, including but not limited to those described below with reference to FIGS. 5 and 6.

Figure 4:
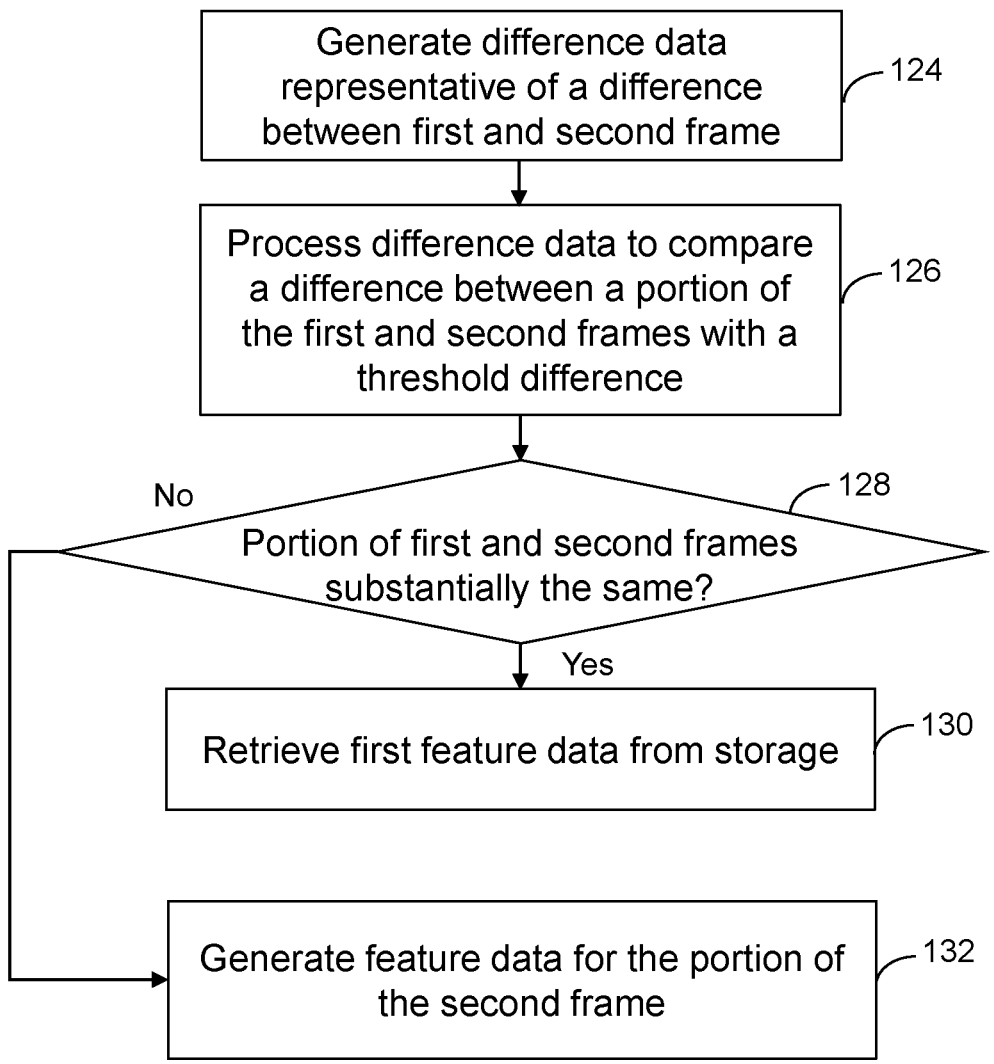
FIG. 4 is a flow diagram illustrating features of a method of processing video data according to examples.

At item 124 of FIG. 4, difference data representative of a difference between the first frame and the second frame is generated. The difference data may for example be generated by calculating a difference between first pixel values of pixels of the first frame and second pixel values of corresponding pixels of the second frame. A pixel value may be representative of an intensity of the light captured by a sensor pixel, which may be proportional to the number of photons captured by that sensor pixel. The intensity may represent a luminance of the captured light, which is for example a measure of the intensity of light per unit area rather than an absolute intensity. In other examples, the pixel value may be representative of a brightness of captured light, which may be considered to correspond to a perception of a luminance, which may or may not be proportional to the luminance. In general, the pixel value may represent any photometric quantity or characteristic that may be used to represent the visual appearance of the pixel. A pixel value may be associated with a particular color channel (such as red, green or blue) or may include a plurality of sub-values associated with each of a plurality of color channels.

To calculate the difference between the first frame and the second frame, the first pixel values may be subtracted from the second pixel values. This may generate a difference (sometimes referred to as a delta) between the first and second frames. For example, what may be referred as a delta frame may be generated, with a difference between the pixel values for the first and second frames stored for each pixel of the delta frame. The difference data representative of the difference may therefore be stored in what may be considered to be a delta frame buffer. For example, first image data representative of the first frame may be fetched from a first frame buffer and second image data representative of the second frame may be fetched from a second frame buffer (which may be a current frame buffer if the difference data is generated upon receipt of the second frame and before receipt of a further frame). The first, second and delta frame buffers may form part of storage which is accessible to other components of a video processing system for implementing the methods according to examples, as described further below.

In examples in which the first frame is similar to the second frame, the difference between the first and second frames will be small. The difference data may therefore include a relatively large number of 0 values (representing a difference of 0 between a first pixel value and a second pixel value for a given pixel of the first and second frames). Furthermore, non-zero values may also be small. This may allow the difference data to be compressed efficiently, which may reduce memory bandwidth for the writing and reading of the difference data from storage. For example, the difference data may be compressed to generate compressed difference data, which may be used in subsequent stages of the method of FIG. 4 (although compression may be omitted in some cases). Any suitable compression algorithm may be used such as Golomb coding methods, which is a family of lossless data compression methods as the skilled person will appreciate, or lossy compression algorithms.

To further reduce memory bandwidth, the difference data may be generated at a relatively early stage in a video processing pipeline, such as by an image signal processor (ISP) or video codec, as described in further detail with reference to FIG. 9. However, this is not intended to be limiting, and in other cases the difference data may be generated at a later stage, such as by a neural network accelerator for implementing a CNN in examples in which the first and/or second feature detection operations include the use of a CNN. For example, rather than generating a delta frame, a difference calculation may be performed using a layer of a neural network such as a CNN, for example a convolutional layer for determining a feature map associated with an input. In such cases, the difference may be between features detected using part of the first feature detection operation, such as a first subset of steps of the first feature detection operation in examples in which the first feature detection operation includes a plurality of steps.

In methods in accordance with FIG. 4, portions of the second frame which are substantially the same as corresponding portions of the first frame may be identified on the basis of the difference data. For example, the first feature data may be retrieved from the storage in response to determining that the first portion of the second frame is substantially the same as the first portion of the first frame. Where differences between the first and second frames are stored as a delta frame (represented by the difference data), pixels of the delta frame with a value of 0, or with a value which meets or is less than a threshold difference, may be considered to correspond to pixels which are substantially unchanged between the first frame and the second frame. These pixels may therefore be identified as belonging to the first portion of the first frame and the first portion of the second frame. The first portion of the first frame may therefore be of any size or shape and may include multiple, disparate or separate pixels or groups of pixels. For example, the first portion of the first frame and the first portion of the second frame (which corresponds to the first portion of the first frame) may be taken as any pixels of the first and second frames for which a delta value meets or is less than the threshold difference. The second portion of the first and second frames may also be any size or shape and may for example include any pixels of the first and second frames for which the delta value exceeds the threshold difference.

This is illustrated schematically in items 126 and 128 of FIG. 4. Item 126 of FIG. 4 involves processing the difference data to compare a first difference between a portion of the first frame and a corresponding portion of the second frame with a threshold difference. At item 128, it is determined whether the portion of the second frame is substantially the same as the portion of the first frame by processing the difference data to determine that the difference meets or is less than a threshold difference. As will be appreciated, though, there are other ways of identifying a first portion of the first and second frames which is substantially unchanged.

If the difference data is compressed, items 126 and 128 may involve processing the compressed difference data rather than the difference data prior to compression to determine whether the portion of the first and second frames is substantially the same. As explained above, this may be more efficient than processing uncompressed difference data.

If the portion of the second frame is determined to be substantially the same as the portion of the first frame, the portion of the second frame may be considered to correspond to the first portion of the second frame. The method of FIG. 4 then involves, at item 130, retrieving the first feature data from storage, where the first feature data is obtained by processing the first frame data associated with the first portion of the first frame. In this way, the first feature data may be used to represent features of the first portion of the second frame, without having to regenerate feature data specifically for the first portion of the second frame.

Conversely, if the portions of the first and second frame are determined to be different at item 128, the method of FIG. 4 involves, at item 132, generating feature data for the portion of the second frame. In this case, the portion of the second frame may be considered to correspond to the second portion of the second frame, which is for example different from a corresponding portion of the first frame. Hence, the processing of item 132 may correspond to the processing of item 120 of FIG. 3, in which the second portion of the second frame is processed using the convolutional layer of the CNN to generate the second feature data, although other first feature detection operations may be used in other examples.

In examples in accordance with the methods described herein, such as the method of FIG. 4, the generation of the second feature data includes processing second frame data associated with the second portion of the second frame using the first feature detection operation, such as a convolutional layer of a CNN. The second frame data may for example represent pixel values of pixels of the second portion of the second frame. This may be the case where the first feature detection operation is configured to receive image data as an input. For example, where the first feature detection operation corresponds to a convolutional layer of a CNN, the convolutional layer may be a first or initial convolutional layer of the CNN, which receives image data (for example representative of pixel values) as an input from the input layer, without processing the image data using other convolutional layers.

In other cases, though, the second frame data may instead be derived from image data representative of the second frame, such as image data representative of pixel values. FIG. 5 shows such an example. At item 134 of FIG. 5, a portion of difference data representative of a difference between the second portion of the second frame and a second portion of the first frame is used as the second frame data. The second portion of the first frame corresponds to the second portion of the second frame. For example, where the difference data represents a delta frame, the portion of the difference data used as the second frame data may represent a portion of the delta buffer in which there is a difference between a portion of the first frame (referred to as the second portion of the first frame) and a corresponding portion of the second frame (referred to as the second portion of the second frame).

In examples such as this, processing of the second frame data using the first feature detection operation, such as the convolutional layer of the CNN, generates what may be referred to as feature map difference data, as it is obtained from the difference data rather than pixel values themselves. The difference data used as the second frame data may be compressed difference data. For example, methods in accordance with FIG. 5 may include compressing the portion of the difference data to generate compressed difference data for use as the second frame data. This may reduce processing and storage requirements.

Figure 5:
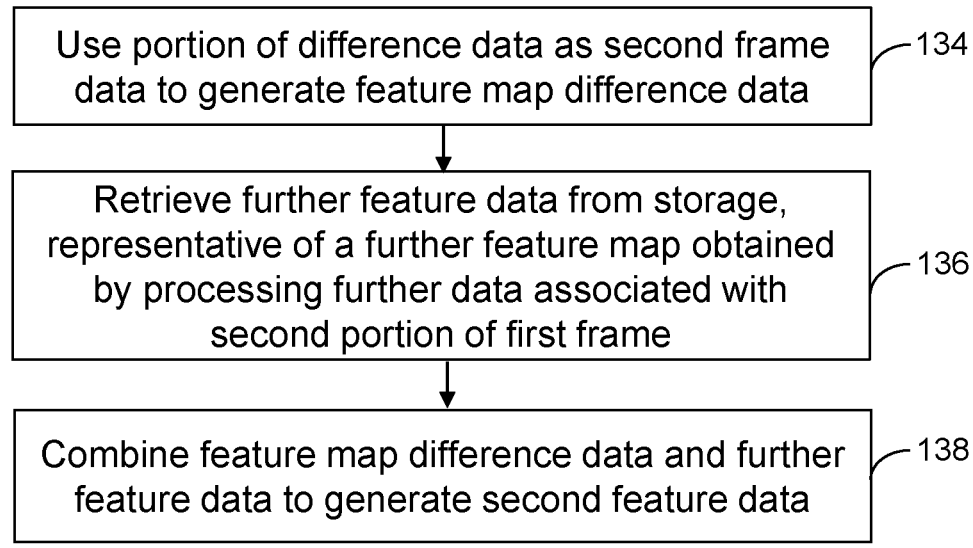
FIG. 5 is a flow diagram illustrating features of a method of processing video data according to further examples.

At item 136 of FIG. 5, further feature data is retrieved from storage. The further feature data in this example is representative of a further feature map obtained by processing further frame data associated with a second portion of the first frame using the first feature detection operation (such as the convolutional layer of the CNN), where the second portion of the first frame corresponds to the second portion of the second frame. For example, both the first and second portions of the first frame (and in some cases an entirety of the first frame) may have been processed using the first feature detection operation, such as the convolutional layer of the CNN. Feature data corresponding to the processed portions of the first frame may have previously been written to the storage such that this feature data is subsequently available for processing of subsequent frames using the feature detection operation.

At item 138 of FIG. 5, the feature map difference data and the further feature data are combined to generate the second feature data. The feature map difference data and the further feature data may be combined in any suitable manner so that the second feature data is associated with the second portion of the second frame. For example, the second feature data may represent a second feature map associated with the second portion of the second frame. As a simple example, feature map difference values represented by the feature map difference data may be added to (or otherwise combined with) feature map values represented by the further feature data, on a pixel-by-pixel basis. In this way, the second feature data for example may represent a sum of a feature map obtained for a corresponding portion of a previous frame (the second portion of the first frame) and a feature map obtained from a difference between the second portions of the first and second frames.

This approach may further reduce processing, storage and/or bandwidth requirements compared with other examples in which the second feature data is obtained by processing the second frame data itself. For example, as the difference data within the second portion of the second frame may represent relatively small values (and possibly values of zero or close to zero in some regions), which may be stored and processed efficiently, it may be more efficient to process the difference data than the second feature data itself, which may have larger values.

In some cases, the method of FIG. 5 may be performed in cases where it is determined that there is a sufficiently large reduction in processing needs. For example, in some cases it may be determined whether the size of the difference data meets or is less than a threshold data size. If so, the difference data may be sufficiently small that it is sufficiently efficient to perform the method of FIG. 5. In these cases, the portion of the difference data may be used as the second frame data and may be processed, for example using the method of FIG. 5 (although other methods are possible), to generate the second feature data. The threshold data size may be determined by analyzing a compression ratio when compressing the difference data.

Conversely, if it is determined that the size of the difference data exceeds a threshold data size, pixel data representative of pixels of the second portion of the second frame as the second frame data. This may therefore reduce the overhead in fetching relatively large difference data from storage, as would otherwise be required if the portion of the difference data is used as the second frame data. This may be the case where the second portion of the second frame is entirely different from the second portion of the first frame. In such cases, there may be less benefit to be gained from using the method of FIG. 5. It is to be noted that, in further cases in which the size of the difference data exceeds the threshold data size, the second frame data may instead correspond to further second feature data. The further second feature data may for example be obtained by processing pixel data representative of pixels of the second portion of the second frame using a feature detection operation. For example, the further second feature data may be representative of a further second feature map obtained from processing the pixel data representative of pixels of the second portion of the second frame using a convolutional layer of the CNN (such as a convolutional layer which is earlier in a series of convolutional layers of the CNN than the convolutional layer to obtain the second feature data). In other words, where the size of the difference data exceeds a threshold data size, the second frame data may be derived solely from the second portion of the second frame, rather than derived partially from the second portion of the second frame and partially from the second portion of the first frame.

Figure 6:
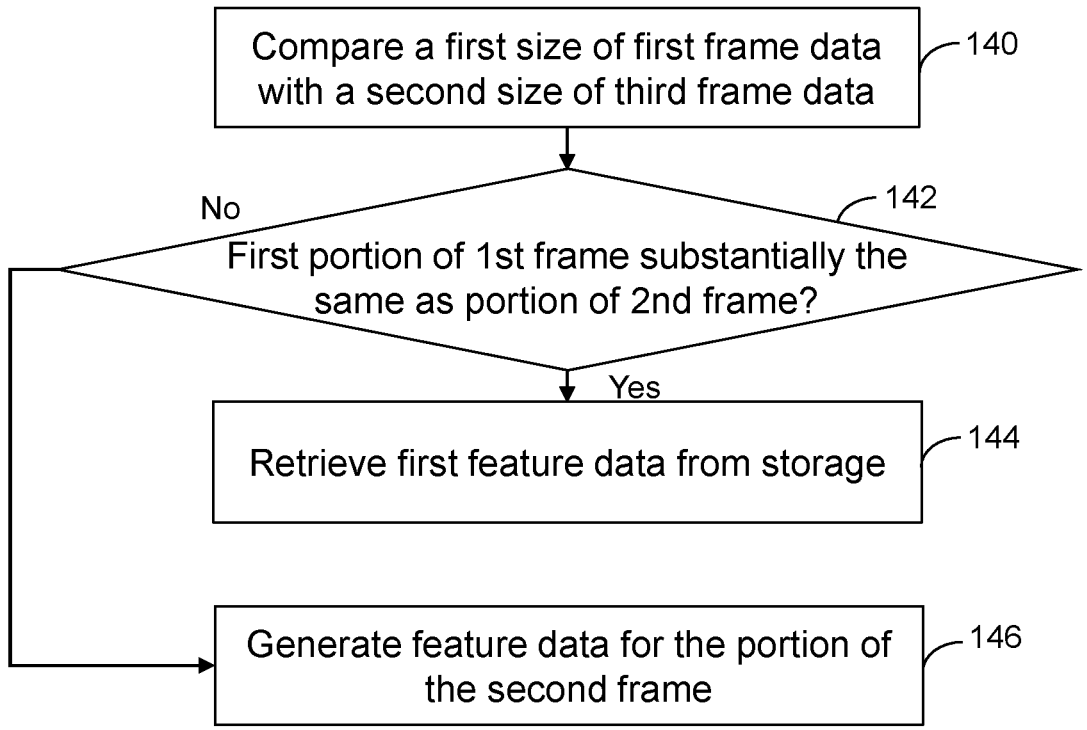
FIG. 6 is a flow diagram illustrating features of a method of processing video data according to yet further examples.

FIG. 6 shows an alternative method of identifying a first portion of the second frame which is substantially the same as a corresponding first portion of the first frame. At item 140 of FIG. 6, a first size of the first frame data (which is associated with the first portion of the first frame) is compared with a second size of third frame data associated with a portion of the second frame. If a size difference between the first size and the second size meets or is less than a size threshold, the portion of the second frame may be identified as substantially the same as the first portion of the first frame at item 142 of FIG. 6. Hence, the portion of the second frame may be considered to correspond to the first portion of the second frame, which is substantially the same as the first portion of the first frame. On this basis, the first feature data may be retrieved from storage at item 144.

If, however, the size difference between the first size and the second size exceeds the size threshold, the portion of the second frame may be considered to correspond to the second portion of the second frame, which is for example different from a corresponding portion of the first frame. On this basis, second feature data may be generated for the second portion of the second frame, at item 146 of FIG. 6, for example using the method of item 120 of FIG. 3.

In the method of FIG. 6, the first and second frames may be segmented or otherwise divided into a plurality of portions before identifying the first portion of the second frame. Each of the plurality of portions may be considered to correspond to a block or a tile. Each block may be a predetermined size, and may be considered to correspond to a tile of a frame (such as the first frame or the second frame). The block may be any shape (not merely square or rectangular) and some blocks may be of a different shape and/or size than other blocks. The size of blocks may depend on the available processing capacity of a video processing system arranged to process the video or may be a fixed size. By dividing the frames into blocks, blocks of one frame which are similar to corresponding blocks of a previous frame may be identified. This may reduce unnecessary processing, by allowing the results of previous processing to be obtained for such blocks rather than redoing the processing.

In such cases, the first and second frames may be segmented into a plurality of blocks before identifying that a first portion of the second frame (which for example corresponds to a block of the plurality of blocks) is substantially the same as the first portion of the first frame (which for example corresponds to a corresponding block, which may for example have the same location within the first and second frames). For example, the size of the blocks corresponding to the first portions of the first and second frames may be compared to determine that the first portions of the first and second frames are substantially the same as each other.

Figure 7:
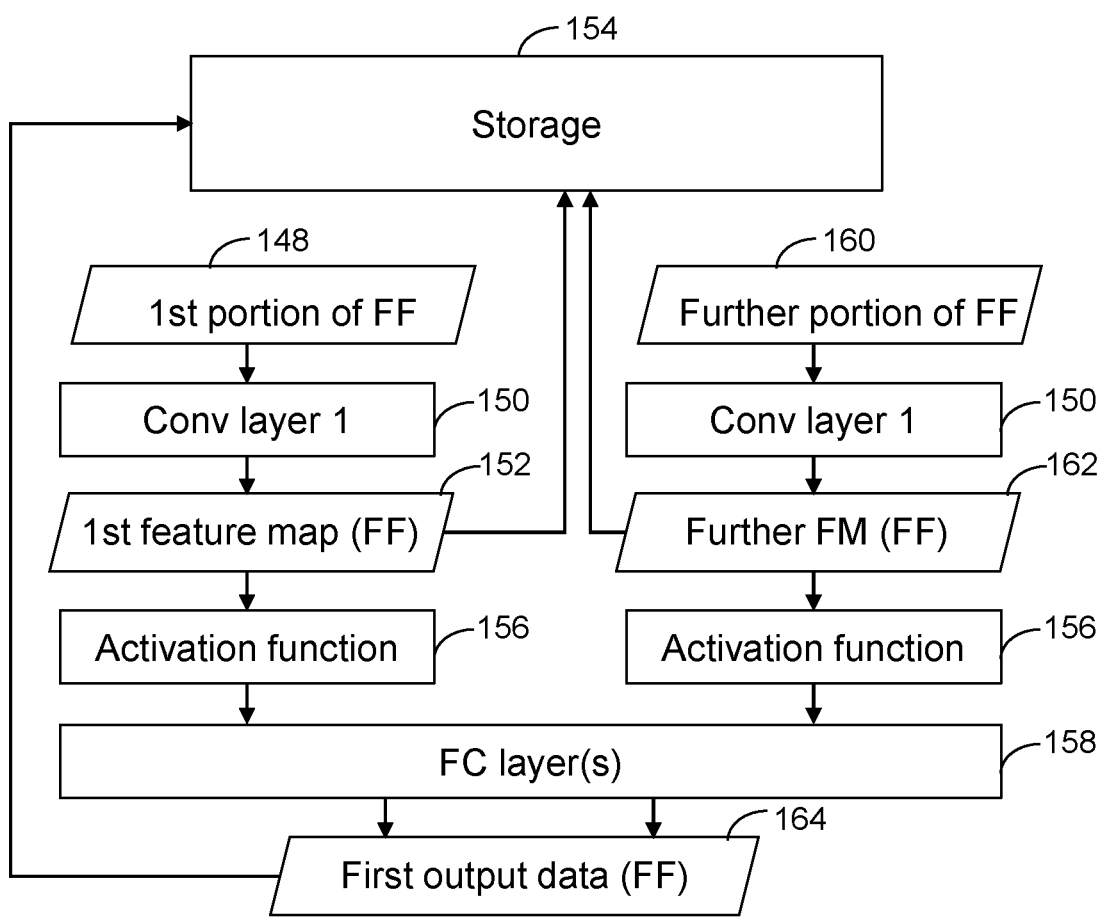
FIG. 7 illustrates schematically the generation of first output data according to examples.

To further illustrate examples in accordance with the methods herein, FIG. 7 shows generation of first output data representative of at least one feature of the first frame. The method of FIG. 7 may for example be performed before receipt of the second frame, or at a time which at least partially overlaps receipt of the second frame. Typically, though, the method of FIG. 7 is started before the second frame is received. In the example of FIG. 7, the first feature detection operation includes the use of a convolutional layer of a CNN, and the second feature operation includes the use of a fully connected layer of the CNN. However, FIG. 7 is merely an illustrative example, and other examples may include other first and/or second feature detection operations.

In the example of FIG. 7, a first portion 148 of a first frame is processed using a first convolutional layer 150 of a CNN. The first portion 148 of the first frame may be transferred to the first convolutional layer 150 via an input layer of the CNN, such as the input layer 116a of FIG. 2. The first portion 148 of the first frame may have previously undergone processing, for example to prepare the first portion 148 of the first frame for display, such as saturation correction, renormalization, white balance adjustment and/or demosaicing, although this is not to be taken as limiting. A first feature map 152 is generated as an output of processing the first portion 148 of the first frame with the first convolutional layer 150. First feature data representative of the first feature map 152 is written to storage 154. Subsequently, the first feature data is processed using an activation function 156. The activation function 156 may reduce the amount of information stored, for example by mapping the first feature map to a more limited range of values than previously. Hence, writing the first feature map 152 to the storage 154 before applying the activation function 156 to the first feature data retains more information than otherwise.

In examples, the first feature data representative of the first feature map 152 is written to the storage 154 before determining that the first portion of the second frame is substantially the same as the first portion of the first frame. For example, the first feature data may be written to the storage 154 before the second frame is received. In this way, the first feature data may be pre-emptively written to the storage 154. Although this may increase the amount of data stored by the storage 154 and a bandwidth of writing data to the storage 154, this may nevertheless provide flexibility for further use of the first feature map 152, and may allow future processing to be reduced by re-using the first feature map 152.

Although not shown in FIG. 7, typically a CNN includes more than one convolutional layer. The output of the activation function 156 in such cases may therefore be processed using at least one further convolutional layer to generate first input data derived from the first feature map 152. The first input data is input to at least one fully connected layer 158 of the CNN.

A further portion 160 of the first frame may be processed using the CNN similarly to the first portion 148 of the first frame. For example, the further portion 160 may be processed using the first convolutional layer 150 of the CNN to generate a further feature map 162. Further feature data representative of the further feature map 162 may be processed using the activation function 156, and the output of the activation function 156 may be processed using at least one further convolutional to generate further input data derived from the further feature map 162. The further input data is also input to the at least one fully connected layer 158 of the CNN.

A similar procedure may be performed for additional portions of the first frame, for example to generate additional input data representative of additional feature map(s) for input to the at least one fully connected layer 158. In this way, feature map(s) may be generated for all of the first frame or a part of the first frame selected for processing, such as a part of the first frame identified as being likely to include an object to be identified by the CNN.

Each portion of the first frame which is processed using the CNN may be processed simultaneously, or during time periods which at least partly overlap with each other. Alternatively, each portion of the first frame may be processed sequentially.

The at least one fully connected layer 158 of the CNN processes the first input data and the further input data (and additional input data, if generated) to generate first output data 164 representative of the first frame. The first output data 164 may for example be written to the storage 154 such that it may subsequently be retrieved if needed. In other examples, the first output data 164 may be written to a different storage than the storage 154 to which the first feature map 152 and the further feature map 162 are written. For example, the first output data 164 may be written to a main storage, whereas the first feature map 152 and the further feature map 162 may written to local storage, such as a local buffer or cache for temporary storage, which is nevertheless accessible to a processor (such as a neural network accelerator) for implementing the CNN.

The method of FIG. 7 may be performed for example where the first frame is an initial frame of a video. In such cases, there may be no prior frame to compare the first frame to. Hence, it may not be possible to re-use data obtained for a previous frame. In other cases, the method of FIG. 7 may be used where it is determined that it is likely that the first feature data may be re-used subsequently. This may be determined for example based on a content or other characteristic of the first frame. For example, where the first frame includes particular objects (such as background objects, like sky or grass), it may be considered likely that subsequent frames may also include these objects, and that feature data obtained from processing of the first frame may be likely to be re-used in subsequent frames.

In other examples, it may be determined that frames subsequent to a plurality of frames including the first and second frames are likely to be similar to the plurality of frames may be determined based on processing of characteristics of at least some of the plurality of frames. For example, difference data may be generated for the first and second frames as described above, which may represent a difference between first pixel values of pixels of the first frame and second pixel values of corresponding pixel values of the second frame. This calculation may be performed on a pixel-by-pixel and may be combined, for example by summation, to determine an overall difference representative of an overall difference between the first and second frames. If the overall difference meets or is less than an overall difference threshold, it may be determined that frames subsequent to the plurality of frames are also likely to be substantially the same as the first and second frames, or at least similar to a sufficient degree that the feature data (such as the first and second feature data) should be written to storage so that it may be re-used for the subsequent frames if appropriate. For example, if the first and second frames are relatively similar, this may be indicative that the content of the video is relatively unchanging and may therefore remain relatively unchanging in subsequent frames too. On the other hand, if the first and second frames are very different, this may indicate that the content of the video is changing rapidly and that subsequent frames may also be relatively different from the first and/or second frames. In such cases, it may be less efficient to write the feature data to the storage, as it may be less likely to be used in future.

Alternatively, a first signature representative of the first frame may be compared with a second signature representative of the second frame. A signature is for example any data which is representative of a content of a frame. For example, a signature may be obtained by applying a hashing algorithm to the frame. A hashing algorithm is for example a one-way algorithm in which an output (referred to as a hash) is deterministic such that the application of the hashing algorithm again to exactly the same input data will produce the same hash. The algorithm is one-way in that the original input data cannot be recovered from the hash alone, even with full knowledge of the hashing algorithm. A hash may be of a fixed length, which may be relatively small, and smaller than frame data representative of the frame itself. In this way, the first and second signatures may represent the first and second frames in a manner which is efficient in terms of storage requirements and processing use.

If the first and second signatures are sufficiently similar, for example with a difference which meets or is less than a signature threshold, the feature data (such as the first and second feature data) may be written to storage so that it may be re-used for the subsequent frames if appropriate.

Other signatures or characteristics may be used to represent a content of the first and second frames. For example, a separate signature may be derived for most and least significant bits of a frame, and compared for two different frames to determine the similarity between these frames and hence the likelihood that subsequent frames may also be similar.

Hence, in some examples, a first plurality of frames may be processed using a first feature detection operation and/or a second feature operation such as those described above in a first mode, in which feature data is not written to storage. In such cases, a delta frame (or other form of difference data) may not be calculated. This may be the case in situations in which it is determined before receipt of a portion of the video that the portion of the video is likely to include rapidly changing content, in which case the methods described herein (such as that of FIG. 1) may be less efficient, or for a portion of the video corresponding to an initial set of frames of the video (for example to establish an initial content of the video). In such cases, a second, different, plurality of frames may be processed in a second mode, in which the methods described herein (such as that of FIG. 1) are used, and in which feature data obtained from processing frame data associated with a portion of a frame using the first feature detection operation, such as a convolutional layer of a CNN, is written to storage for subsequent re-use. In such cases, methods may include switching between the first mode and the second mode depending on characteristics of the video, such as a content of the video or a time of receipt of the video or a frame number of a frame, such as a frame position of the frame within a series of frames.

A determination of which of the first and second modes to use for the processing of a frame may also be made based on a performance counter of a video processing system for implementing the methods described herein. For example, if the second mode is being used but the performance counter indicates that the second mode is relatively inefficient, the video processing system may switch to use the first mode, which may be more efficient in such cases. Similarly, such a determination may be based on an amount of data written or read to storage in the first or second mode, including, for example, difference data and feature data in the second mode.

In other cases, a determination of whether to use the first or second mode may be made based on an intended use of the processing of the video. For example, if the video is to be processed as part of a computer vision process for a vehicle, a higher degree of accuracy may be required than for other applications, such as a security camera. The first mode may therefore be used in situations in which accuracy is more important than efficiency, and the second mode may be used in other cases.

In further examples which are similar to that of FIG. 7, feature data obtained by processing the first frame data or a previous feature map derived from the first portion of the first frame may be written to storage in addition to or instead of the first feature data. For example, the first feature data and final feature data representative of a final output of the first feature detection operation, such as a final feature map generated by a final convolutional layer of a CNN, may both be written to storage. In further examples, further intermediate values generated during the first feature detection operation, such as intermediate feature maps generated between the generation of the first feature data and the final feature data, may also be written to the storage. This may provide further flexibility for future processing. For example, where the first frame is segmented into blocks or tiles the first feature data may be retrieved for a portion of a block corresponding to a substantially similar portion of a corresponding block of the second frame. A different portion of the corresponding block of the second frame may not have a corresponding portion of the block of the first frame. Second feature data for this portion of the second frame may therefore be newly generated. However, if the entirety of the block of the first frame is substantially the same as the entirety of a corresponding block of the second frame, the final feature data may be retrieved from the storage for the block of the second frame (rather than retrieving the first feature data and processing the first feature data using the first feature detection operation, such as at least one further convolutional layer of the CNN). The final feature data may then be processed along with additional data representative of an output of the first feature detection operation, such as the convolutional layers of the CNN, for an additional portion of the second frame using the second feature detection operation, such as at least one fully connected layer of the CNN, to generate output data representative of at least one feature of the second frame. This may further reduce the processing demands of the method. In examples such as this, the final feature data may be written to the storage before processing the final feature data using an activation function to generate the first input data (although in some cases, the activation function may be omitted).

Figure 8:
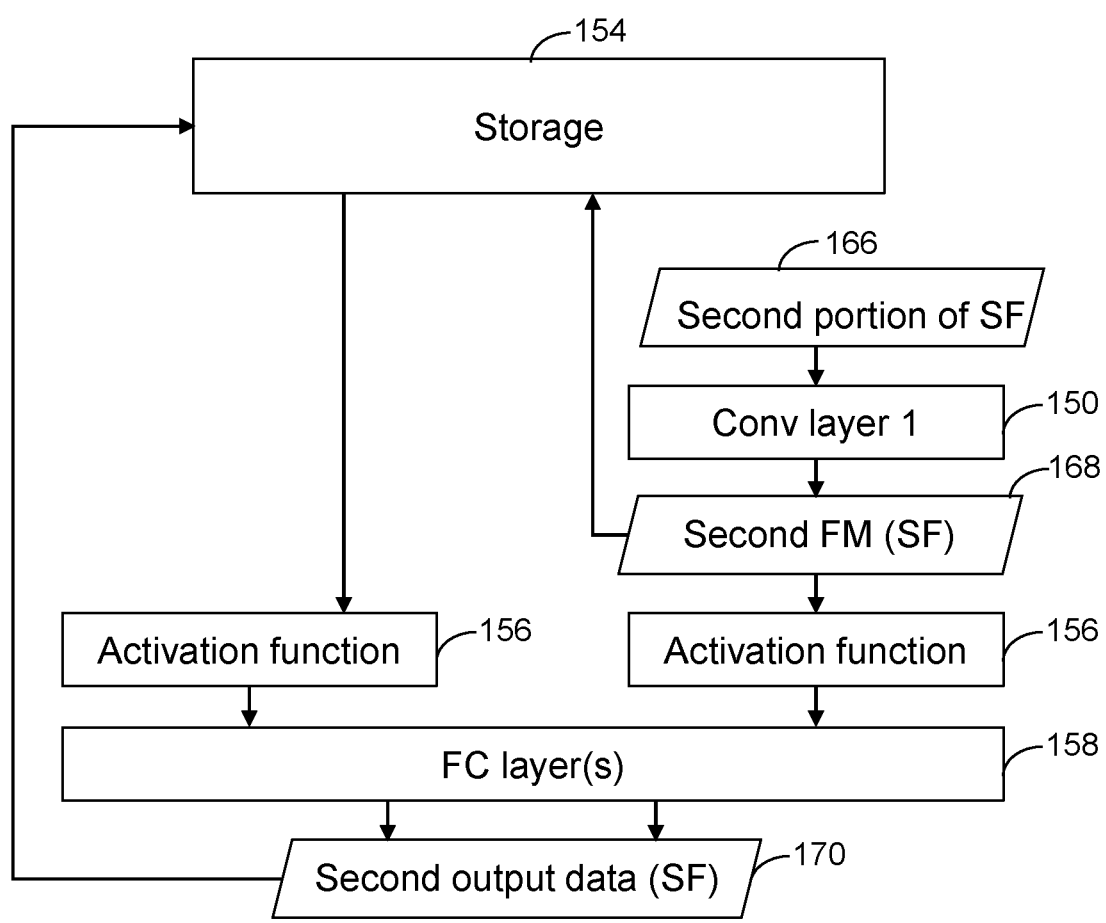
FIG. 8 illustrates schematically the generation of second output data according to examples.

FIG. 8 illustrates schematically the generation of second output data representative of at least one feature of the second portion of the second frame. Certain features of the generation of the second output data are omitted, for clarity. For example, prior to the items shown in FIG. 8, the first and second portions of the second frame may have been identified, the first portion of the second frame corresponding to the first portion of the first frame. These portions of the second frame may have been identified for example using the methods described above, such as those of FIGS. 4 and 6. The method of FIG. 8 may be used subsequently to the method of FIG. 7. Hence, features of FIG. 8 which are the same as corresponding features of FIG. 7 are labelled with the same reference numeral; corresponding descriptions are to be taken to apply. FIG. 8 illustrates an example of a second feature detection operation, which involves the use of a fully connected layer of a CNN (which in this case is the CNN referred to with reference to FIG. 7). However, in other examples, a different second feature detection operation may be used.

A second portion 166 of the second frame is processed using the first convolutional layer 150 of the CNN. The second portion 166 of the second frame may be transferred to the first convolutional layer 150 via an input layer of the CNN, such as the input layer 116a of FIG. 2. As for the first portion 148 of the first frame (described with reference to FIG. 7), the second portion 166 of the second frame may have previously undergone processing, for example to prepare the second portion 166 of the second frame for display, such as saturation correction, renormalization, white balance adjustment and/or demosaicing, although this is not to be taken as limiting. A second feature map 168 is generated as an output of processing the second portion 166 of the second frame with the first convolutional layer 150. Second feature data representative of the second feature map 168 is written to the storage 154. In this way, the second feature data may be retrieved from the storage 154 for re-use in subsequent frames, for example where it is determined that the second portion of the second frame is substantially the same as a corresponding portion of a subsequent frame.

Subsequently, the second feature data is processed using the activation function 156. The output of the activation function 156 in such cases may be processed using at least one further convolutional layer (in examples in which the CNN includes at least one further convolutional layer) to generate second input data derived from the second feature map 168. The second input data is input to the at least one fully connected layer 158 of the CNN.

In the example of FIG. 8, the first portion of the second frame has been identified as being substantially the same as the first portion of the first frame. Hence, in this example, the first feature data representative of the first feature map (which may be generated and written to storage as shown in FIG. 7), is retrieved from the storage, and processed using the activation function 158. As explained above, the output of the activation function 156 may be processed using at least one further convolutional layer to generate the first input data derived from the first feature map. The first input data is also input to the at least one fully connected layer 158 of the CNN.

Additional input data representative of additional portions of the second frame may also be obtained in a similar way to obtaining additional input data for the first frame, as described with reference to FIG. 7.

The at least one fully connected layer 158 of the CNN processes the first input data and the second input data (and additional input data, if generated) to generate second output data 170 representative of the second frame. As for the first output data 164 of FIG. 7, the second output data 170 may be written to the storage 154 or to a different storage than the storage 154 to which the first feature map 152 and the second feature map 168 are written.

Figure 9:
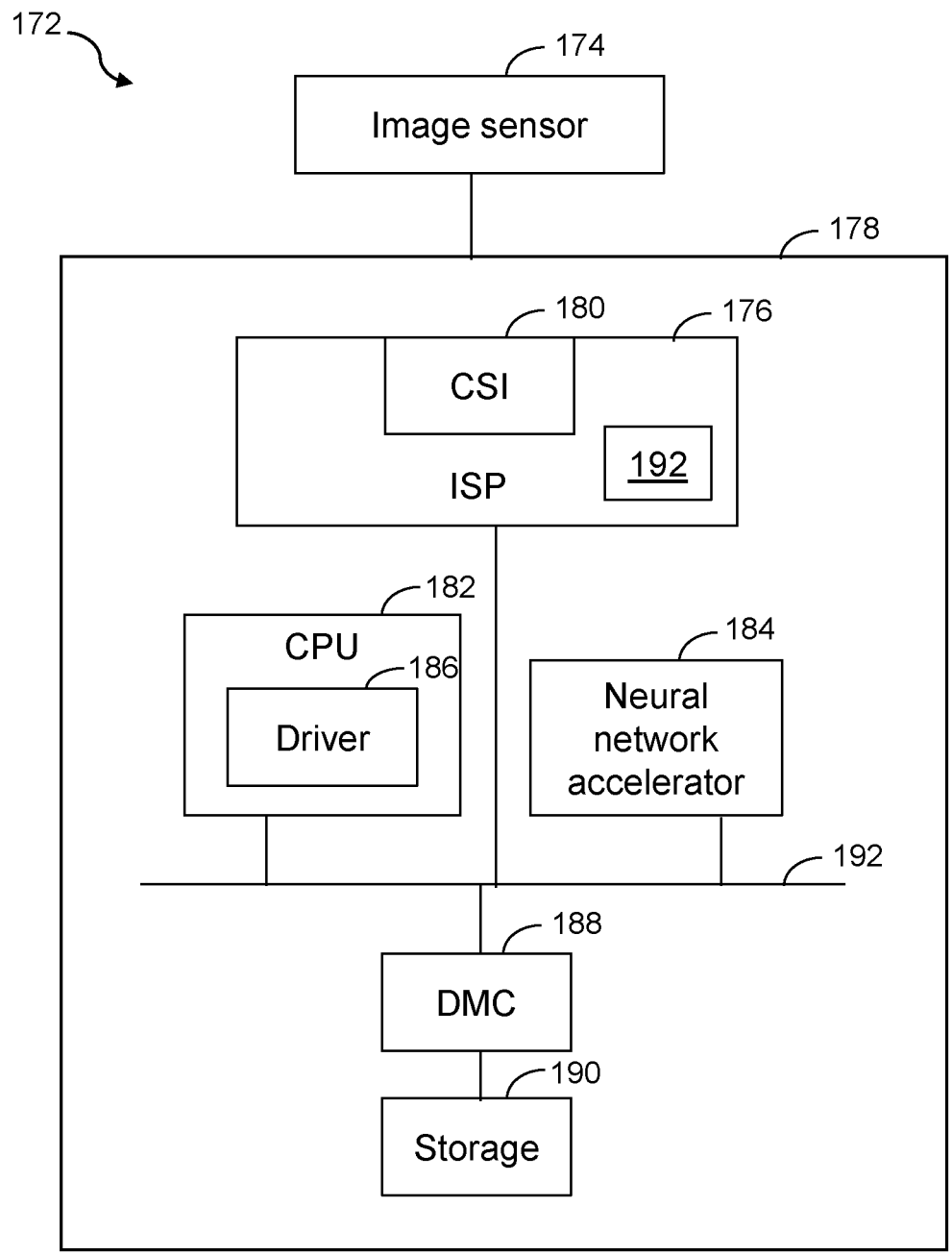
FIG. 9 shows schematically internal components of a video processing system according to examples.

An example of a video processing system 172 for use with the methods described herein is shown schematically in FIG. 9. The video processing system 172 of FIG. 9 may be coupled to or form part of a computer device, such as a personal computer, a laptop, a smartphone or an on-board computer device which may be coupled to or mounted within a vehicle such as a car.

The video processing system 172 includes an image sensor 174. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 174 in this example is arranged to capture video data, which may be in the form of a series of images captured sequentially, with each image corresponding to a frame of the video.

In FIG. 9, the image sensor 174 is arranged to transfer video data to an image signal processor (ISP) 176 of a computing system 178 via a camera serial interface (CSI) 180. The ISP 176 may perform initial processing of video data (such as individual frames of the video) to prepare the video for display. For example, the ISP 176 may perform saturation correction, renormalization, white balance adjustment and/or demosaicing, although this is not to be taken as limiting.

The computing system 178 of FIG. 9 includes at least one processor. The at least one processor is for example configured to perform the methods described herein. In this example, the computing system 178 includes a central processor unit (CPU) 182. The computing system 178 also includes a neural network accelerator 184, which is a processor dedicated to implementing at least classification of data using a neural network. For example, the neural network accelerator 184 may be configured to implement a neural network such as the CNN described above. In other examples, though, the first and/or second feature detection operations, which may include a neural network, may be implemented using a more general processor, such as the CPU or a GPU.

In other examples, though, the computing system may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 182 of FIG. 9 includes a driver 186 which for example provides an interface between software configured to control or configure the neural network and the neural network accelerator 184, which is configured to perform the processing to implement the neural network (in this example in which a neural network is used for the feature detection operation). The driver 186 may therefore form part of or correspond to a control system for controlling the operation of the at least one processor.

The computing system 178 of FIG. 9 also includes a dynamic memory controller (DMC) 188 which may be used to control access to storage 190 of the computing system 178. The storage 190 is for example configured to store the video data received from the ISP 176.

The storage 190 is for example external to the neural network accelerator 184 and may be a random access memory (RAM) such as DDR-SDRAM (double data rate synchronous dynamic random access memory). In other examples, the storage 190 may be or include a non-volatile memory such as Read Only Memory (ROM) or a solid state drive (SSD) such as Flash memory. The storage 190 in examples may include further storage devices, for example magnetic, optical or tape media, compact disc (CD), digital versatile disc (DVD) or other data storage media. The storage 190 may be removable or non-removable from the computing system 178. In examples, the neural network 184 may also include local storage, which may nevertheless be considered to form part of the storage of the video processing system 172.

The components of the computing system 178 in the example of FIG. 9 are interconnected using a systems bus 192. This allows data to be transferred between the various components. The bus 192 may be or include any suitable interface or bus. For example, an ARM® Advanced Microcontroller Bus Architecture (AMBA®) interface, such as the Advanced eXtensible Interface (AXI), may be used.

The at least one processor may be configured to identify a first portion of the second frame and a second portion of the second frame. For example, the at least one processor may include a processor of the ISP 176, which may be used to identify the first and second portions of the second frame. In this way, further processing of the second frame may be averted if it is determined that an entirety of the second frame is substantially the same as an entirety of the first frame. In such cases, the ISP 176 may also be arranged to generate difference data such as that described above. For example, the ISP 176 may generate a delta frame based on the first frame and the second frame. In such cases, the ISP 176 may itself include storage, such as one or more buffers for temporary storage of the delta frame, the first frame and the second frame. In examples, the ISP 176 may include a video codec 192 which is configured to generate the difference data, although in other examples other components of the ISP 176 (or of other elements of the video processing system 172) may be used to generate the difference data or other data by which the first and second portions of the second frame may be identified.

In examples, the at least one processor may be configured to retrieve the first feature data from storage. In such cases, the processor arranged to retrieve the first feature data from storage may be a processor of the neural network accelerator 184, and the storage may be the storage 190 (which is for example system storage or a main memory) or local storage accessible to the neural network accelerator 184. In examples in which the neural network accelerator 184 is implemented in hardware, the local storage may be on-chip memory. The local stage may for example be a static random access memory (SRAM), although other memory types are possible.

The at least one processor, for example the processor of the neural network accelerator 184 may be configured to process the second portion of the second frame using a first feature detection operation, such as a convolutional layer of a CNN, to generate the second feature data, and to process first input data derived from the first feature data and second input data derived from the second feature data to generate output data representative of at least one feature of the second frame.

The at least one processor may be configured to retrieve the first feature data from storage in response to determining, on the basis of difference data, which may be generated as explained above, that the first portion of the second frame is substantially the same as the first portion of the first frame. For example, the first feature data may be retrieved by the neural network accelerator 184 from the storage 190 on the basis that the difference data indicates that the first portion of the second frame is substantially the same as the first portion of the first frame. Alternatively, the difference data may be transferred to the neural network accelerator 184, which may then retrieve the first feature data from local storage of the neural network accelerator 184 on the basis that the difference data indicates that the first portion of the second frame is substantially the same as the first portion of the first frame.

It is to be appreciated that the video processing system 172 of FIG. 9 is merely an example and other video processing systems may be used in other examples.

The above examples are to be understood as illustrative examples. Further examples are envisaged. In examples, the method may include identifying a processing portion of the second frame with non-zero pixel values and identifying the first and second portions of the second frame within the processing portion. As for the first and second portions of the second frame, the processing portion may be any shape and size and may include connected or disconnected portions of the second frame. A non-processing portion of the second frame, for which pixel values are zero, may not be processed to generate feature data, such as a feature map, as it can be determined without processing the non-processing portion that the feature data, such as feature map values corresponding to the non-processing portion, will also be zero. Furthermore, the first feature data may be retrieved solely for the first portion of the second frame for which the pixel values are non-zero values. This may further concentrate data processing operations (such as reading and writing data to storage) on data for which a non-zero output may be generated.

In examples described above, the first input data (which is obtained from the processing of the first frame) may be used to represent the first portion of the second frame where it is determined that the first portion of the second frame is the same or substantially the same as the first portion of the first frame. In such cases, processing of the first portion of the second frame using the first feature detection operation may be omitted. However, in examples in which the first portions of the first and second frames are substantially the same but not identical, processing of the first portion of the second frame may not be entirely omitted. Instead, the first portion of the second frame may be partially processed using the first feature detection operation, for example using a subset of elements or steps of the first feature detection operation, without processing the first portion of the second frame using an entirety of the first feature detection operation. For example, where the first feature detection operation includes processing input data using a series of convolutional layers of a CNN, the first portion of the second frame may be processed using an initial convolutional layer, or initial convolutional layers, of the CNN. However, processing of the output of these layer(s) using further convolutional layers of the CNN may be omitted. This may be the case, for example, where an output of these layer(s) for the first portion of the second frame is the same or substantially the same (such as within 20%, 15%, 10%, 5% or 1%) as a corresponding output of these layer(s) for the first portion of the first frame. After identifying that the processing of the first portion of the second frame using the convolutional layers of the CNN converges on an output which is substantially the same as an output of processing of the first portion of the first frame using the convolutional layers of the CNN, the first feature data (which may represent an output of processing the first frame data using the convolutional layers of the CNN) may be retrieved and used instead of continuing to process the first portion of the second frame. This may ensure a sufficient correspondence between the output of the feature detection operation (such as the convolutional layers of a CNN), while reducing the amount of computation performed.

In such cases, a difference calculation (for example to generate the difference data described above) may be performed partway through the first feature detection operation, to calculate a difference for the first portion of first and second frames at this stage in the first feature detection operation. For example, a feature map obtained by processing the first frame data associated with the first portion of the first frame using one or more convolutional layers of a CNN may be compared with a corresponding feature map obtained by processing the second frame data associated with the first portion of the second frame using the one or more convolutional layers of the CNN to calculate a difference between these feature maps. This may be done on an element-by-element basis, for each of the elements of the feature maps, and may be combined, for example by summation, to calculate an overall difference between the feature maps.

In yet further examples in which the first portions of the first and second frames are substantially the same but not identical and in which processing of the first portion of the second frame is omitted, a corresponding portion of a subsequent frame may be processed using the feature detection operation. For example, a corresponding portion of at least one subsequent frame may be processed periodically using the feature detection operation, so that a difference between the first portion over a series of frames remains sufficiently small that the feature detection operation can be omitted in at least some of the frames without unduly affecting the accuracy of the detection of at least one feature of these frames.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of processing video data representative of a video comprising a first frame and a second frame to generate output data representative of at least one feature of the second frame, the method comprising:
    identifying a first portion of the second frame and a second portion of the second frame, wherein the first portion of the second frame is substantially the same as a first portion of the first frame, and the first portion of the second frame is different from the second portion of the second frame;
    retrieving first feature data from storage, the first feature data obtained by processing first frame data associated with the first portion of the first frame using a first feature detection and/or classification operation;
    generating second feature data, the generating the second feature data comprising processing second frame data associated with the second portion of the second frame using the first feature detection and/or classification operation; and
    processing a representation of at least part of the second frame using a second feature detection and/or classification operation to generate the output data, wherein the representation of the at least part of the second frame comprises a first portion derived from the first feature data and a second portion derived from the second feature data.

2. The method according to claim 1, wherein:
    the processing the first frame data using the first feature detection and/or classification operation comprises processing the first frame data using a convolutional layer of a convolutional neural network (CNN) to obtain the first feature data, the first feature data being representative of a first feature map;
    the processing the second frame data using the first feature detection and/or classification operation comprises processing the second frame data using the convolutional layer of the CNN to obtain the second feature data, the second feature data being representative of a second feature map; and
    the processing the representation of the at least part of the second frame using the second feature detection and/or classification operation comprises processing the representation of the at least part of the second frame using a fully connected layer of the CNN.

3. The method according to claim 1, comprising retrieving the first feature data from the storage in response to determining that the first portion of the second frame is substantially the same as the first portion of the first frame.

4. The method according to claim 3, wherein determining that the first portion of the second frame is substantially the same as the first portion of the first frame comprises generating difference data representative of a difference between the first frame and the second frame.

5. The method according to claim 4, wherein determining that the first portion of the second frame is substantially the same as the first portion of the first frame comprises processing the difference data to determine that a difference between the first portion of the second frame and the first portion of the first frame meets or is less than a threshold difference.

6. The method according to claim 4, comprising compressing the difference data to generate compressed difference data, and determining that the first portion of the second frame is substantially the same as the first portion of the first frame on the basis of the compressed difference data.

7. The method according to claim 4, wherein generating the difference data comprises calculating a difference between first pixel values of pixels of the first frame and second pixel values of corresponding pixels of the second frame.

8. The method according to claim 3, wherein determining that the first portion of the second frame is substantially the same as the first portion of the first frame comprises comparing a first size of the first frame data with a second size of third frame data associated with the first portion of the second frame.

9. The method according to claim 1, wherein the second frame data corresponds to a portion of difference data representative of a difference between the second portion of the second frame and a second portion of the first frame, the second portion of the first frame corresponding to the second portion of the second frame.

10. The method according to claim 9, comprising:
determining that a size of the difference data meets or is less than a threshold data size; and, in response,
using the portion of the difference data as the second frame data.

11. The method according to claim 9, comprising compressing the portion of the difference data to generate compressed difference data, wherein the second frame data corresponds to the compressed difference data.

12. The method according to claim 9, wherein the processing the second frame data using the first feature detection and/or classification operation comprises processing the second frame data using a convolutional layer of a convolutional neural network (CNN) to obtain the second feature data, the second feature data corresponding to feature map difference data, and the method comprises:
retrieving further feature data from storage, the further feature data representative of a further feature map obtained by processing further frame data associated with a second portion of the first frame using the convolutional layer of the CNN, the second portion of the first frame corresponding to the second portion of the second frame; and
combining the feature map difference data and the further feature data to generate the second feature data.

13. The method according to claim 1, comprising:
determining that a size of difference data representative of a difference between the second portion of the second frame and a second portion of the first frame exceeds a threshold data size, the second portion of the first frame corresponding to the second portion of the second frame; and, in response,
using pixel data representative of pixels of the second portion of the second frame as the second frame data.

14. The method according to claim 1, comprising:
processing the first portion of the first frame using the first feature detection and/or classification operation to generate the first feature data; and
writing the first feature data to the storage before determining that the first portion of the second frame is substantially the same as the first portion of the first frame.

15. The method according to claim 14, wherein:
the processing the first frame data using the first feature detection and/or classification operation comprises processing the first frame data using a convolutional layer of a convolutional neural network (CNN) to obtain the first feature data, the first feature data being representative of a first feature map; and the writing the first feature data to the storage comprises writing the first feature data to the storage before processing the first feature data using an activation function.

16. The method according to claim 1, wherein the output data is second output data, and the method comprises processing first input data derived from the first feature data and further input data derived from further feature data associated with a further portion of the first frame using the second feature detection and/or classification operation to generate first output data representative of at least one feature of the first frame.

17. The method according to claim 1, comprising deriving the first portion of the representation of the at least part of the second frame from the first feature data by processing the first feature data using an activation function.

18. A video processing system comprising:
at least one processor; and
storage accessible by the at least one processor, the storage configured to store video data representative of a video comprising a first frame and a second frame,
wherein the at least one processor is configured to:
identify a first portion of the second frame and a second portion of the second frame, wherein the first portion of the second frame is substantially the same as a first portion of the first frame, and the first portion of the second frame is different from the second portion of the second frame;
retrieve first feature data from the storage, the first feature data obtained by processing the first portion of the first frame using a first feature detection and/or classification operation;
process the second portion of the second frame using the first feature detection and/or classification operation to generate second feature data; and
process a representation of at least part of the second frame using a second feature detection and/or classification operation to generate the output data, wherein the representation of the at least part of the second frame comprises a first portion derived from the first feature data and a second portion derived from the second feature data.

19. The video processing system according to claim 18, wherein the at least one processor is configured to:
generate difference data representative of a difference between the first frame and the second frame; and
retrieve the first feature data from the storage in response to determining, on the basis of the difference data, that the first portion of the second frame is substantially the same as the first portion of the first frame.

20. The video processing system according to claim 19, comprising a video codec configured to generate the difference data.

* * * * *